Figure 1:
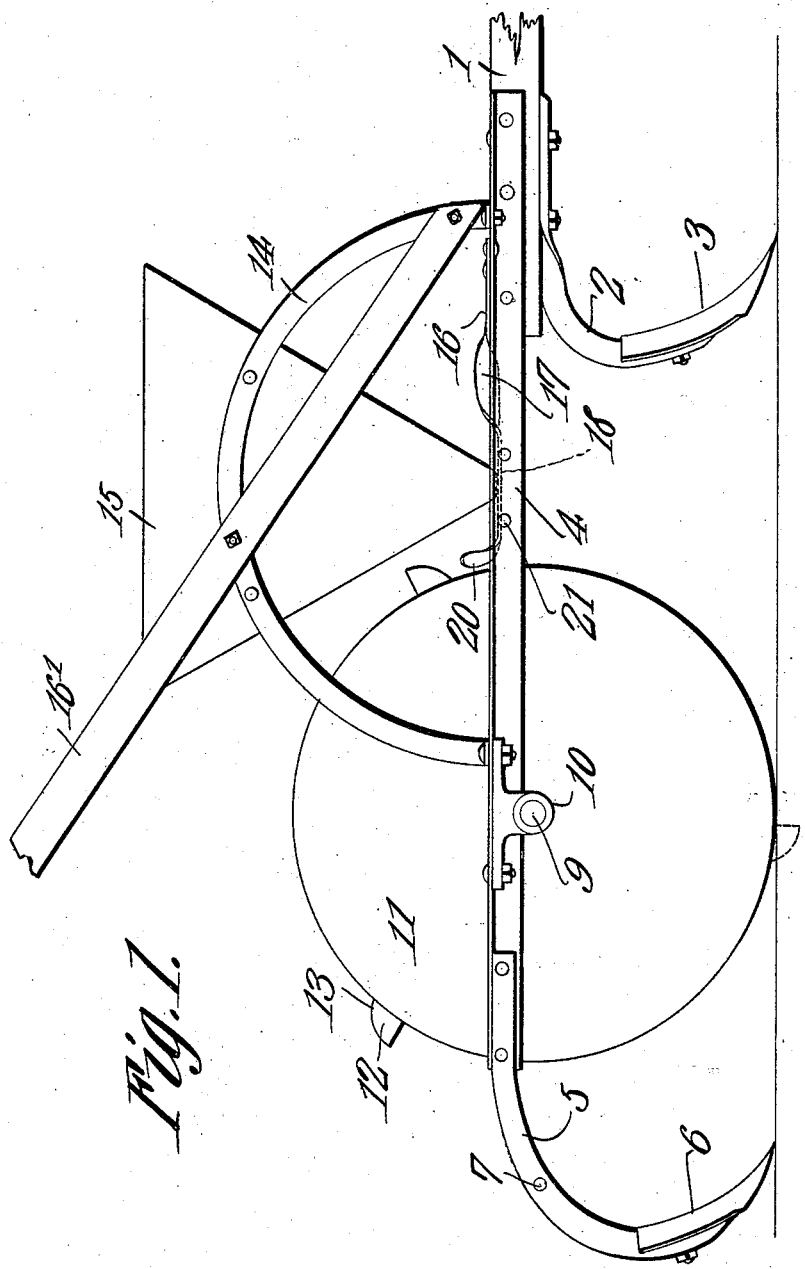

A. A. WOFFORD.
PLANTER.
APPLICATION FILED JULY 22, 1908.

906,351.

Patented Dec. 8, 1908.
2 SHEETS—SHEET 1.

Witnesses

Inventor
Aaron A. Wofford.
By C. A. Snow & Co.
Attorneys

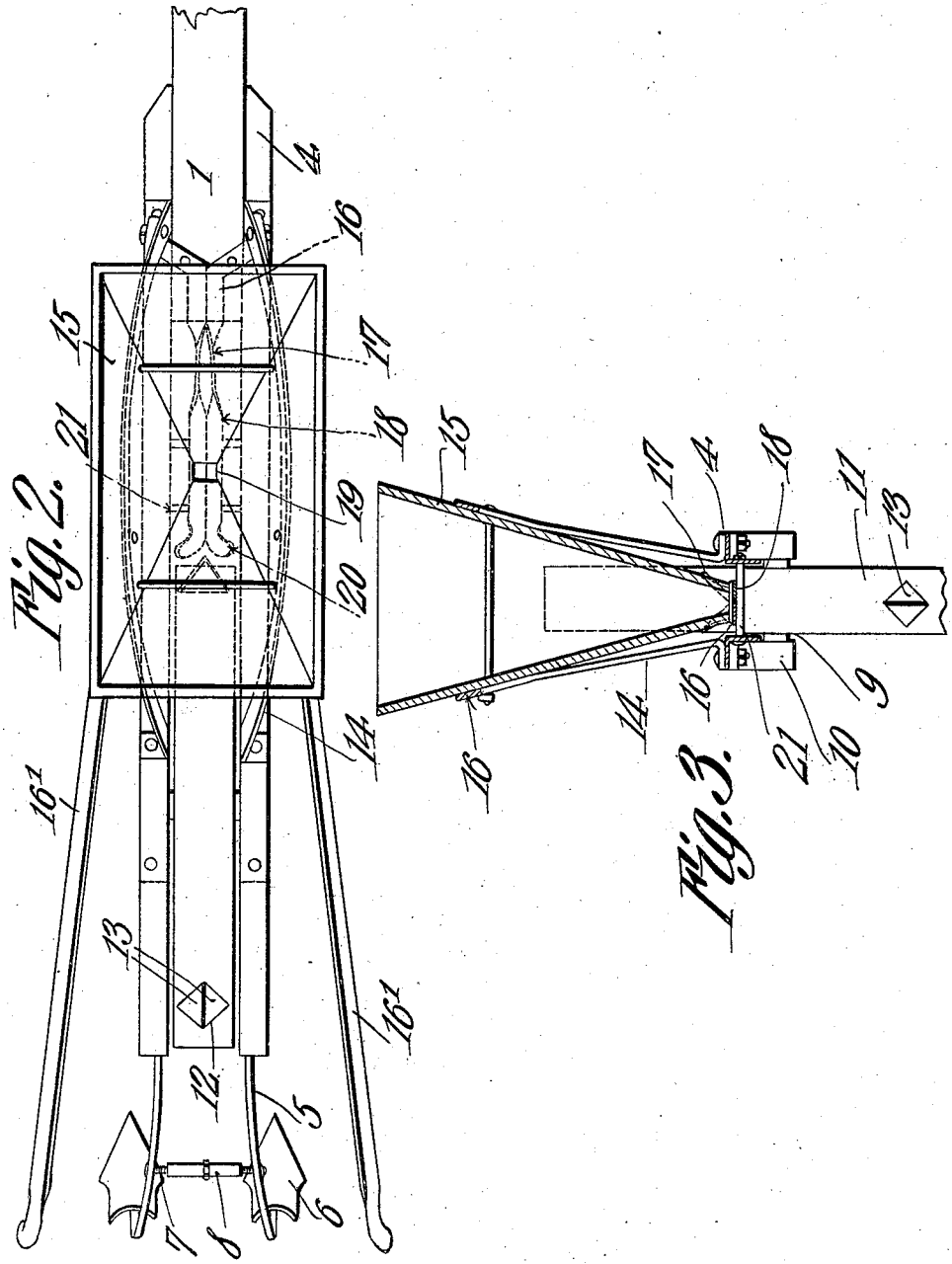

UNITED STATES PATENT OFFICE.

AARON ARTHUR WOFFORD, OF STATHAM, GEORGIA.

PLANTER.

No. 906,351.  Specification of Letters Patent.  Patented Dec. 8, 1908.

Application filed July 22, 1908. Serial No. 444,808.

*To all whom it may concern:*

Be it known that I, AARON ARTHUR WOFFORD, a citizen of the United States, residing at Statham, in the county of Jackson and State of Georgia, have invented a new and useful Planter, of which the following is a specification.

This invention has relation to planters, and it consists in the novel construction and arrangement of its parts, as hereinafter shown and described.

The object of the invention is to provide a planter, which is adapted especially to be used for depositing cotton-seed and similar lint-bearing grain.

An advantage gained by the present construction is that the implement may be so adjusted as to deposit seed at desired predetermined intervals, thereby saving considerable in the way of seed, and also saving labor in hoeing and otherwise thinning the plants, after they begin to come up.

The implement consists primarily of a frame having at its forward end a furrow-opener and at its rear end furrow-closers. A wheel is journaled for rotation at an intermediate point of the frame, and a hopper is mounted upon the frame. Resilient arms are attached at their forward ends to the frame, and are adapted to come together and close the outlet of the hopper. Spurs are mounted upon the periphery of the said wheels, and are adapted to engage the said spring arms and force the same apart, whereby sufficient space is provided at the outlet of the hopper for the seed to fall through and enter the furrow, which is previously opened by the said furrow-opener.

In the accompanying drawings, Figure 1 is a side elevation of the planter. Fig. 2 is a top plan view of the same, and Fig. 3 is a transverse sectional view of the same.

The planter consists of the beam 1, to the under side of which is attached the standard 2. The plow-point 3, is carried by the lower portion of the said standard 2, and the said point 3 forms the furrow-opener of the implement. The side bars 4, are connected at their forward ends with the side of the beam 1, and the standards 5, are attached to the rear end portions of the said bars 4. The plow-points 6, are carried by the standards 5, and from the furrow-closers. The cross-rod 7, connects the said standards 5 together, and may be provided with a turn buckle 8, or other means for longitudinally extending the said cross-bar 7, whereby the said standards 5, may be spread apart or drawn together as desired. The axle 9, is journaled in the bearings 10, which in turn are mounted upon the bars 4. The ground-wheel 11, is mounted upon the axle 9, and is provided upon its periphery with a series of spurs 12. The spurs 12, are provided with the beveled faces 13, which are disposed in the direction in which the wheel 11 turns. The arch-bars 14 are mounted upon the side bars 4, and the hopper 15, is supported by the said arch-bars 14. The lower portions of the handles 16, are connected with the said arch-bars 14.

The resilient arms 16, are connected at their forward ends with the beam 1, and the bars 4. The said arms 16, are preferably in the form of strips of metal, and at the points immediately behind their points of connection with the said frame work of the implement, the said arms 16, are twisted into the vertical section 17, after which they are again twisted into horizontal sections 18, which are adapted to lie under the outlet 19, of the hopper 15. The rear end portions of the said arms 16 are disposed away from each other and are upwardly curved as at 20, and the said portions 20 lie in the path of movement of the spurs 12, and are adapted to be engaged by the beveled surfaces 13 thereof and spread apart.

The operation of the implement is as follows:—As the machine is drawn along the ground, the plow point 3 will open a furrow, and as the spurs 12, mounted upon the ground wheel 11, successively engage the curved end portion 20, of the arms 16, the said arms 16 are spread apart so that sufficient opening is provided below the outlet 19, of the hopper 15, in order to permit the seeds to pass from the said hopper and between the edges of the said arms 16, and fall into the furrow which is opened by the opener 3. As soon as the spur 12 passes beyond the curved extremities 20 of the arms 16, the tension of the said arms will cause the same to move together at their edges, when they will close the outlet 19, at the bottom of the hopper, or interrupt the flow of the seed from the said hopper. As the implement progresses along the row, the coverer 6, casts the earth upon the seed deposited in the furrow opened by the opener 3, and thus the operation of planting is effected.

From the above description it is obvious that a great saving is made in the seed, for it is dropped at predetermined intervals, as the spurs may be arranged at any desired distance apart upon the periphery of the ground-wheel 11, and thus in addition to saving the seed it will be unnecessary to thin out the subsequent plants, and consequently a saving in labor is also effected. The cross-rods 21 are secured at their ends in the side bars 4, and lie under the horizontal portions 18, of the arms 16, and serve as guides for the same.

Having described my invention, what I claim as new, and desire to secure by Letters Patent, is:—

In a planter a hopper, spring arms attached to the frame of the planter at their forward ends, and having their forward end portions occupying horizontal planes, said arms having at intermediate points portions twisted into vertical planes, said arms having at points behind the said vertically disposed portions horizontally disposed portions adapted to come together at their edges below the hopper outlet, said arms having at their rear extremities curved portions, a member journaled in the frame of the planter, spurs carried by the said member, and adapted to successively engage the curved rear end portions of said arms and force the same apart.

In testimony that I claim the foregoing as my own, I have hereto affixed my signature in the presence of two witnesses.

AARON ARTHUR WOFFORD.

Witnesses:
J. L. HAYNIE,
W. B. BOLTON.